Nov. 27, 1928.
H. O. SIMMONS
1,693,319
TENSION INDICATOR FOR BRUSH HOLDERS
Filed Dec. 1, 1926
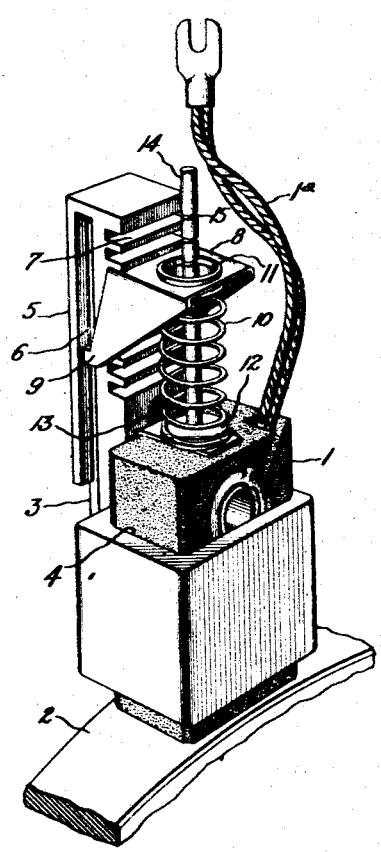
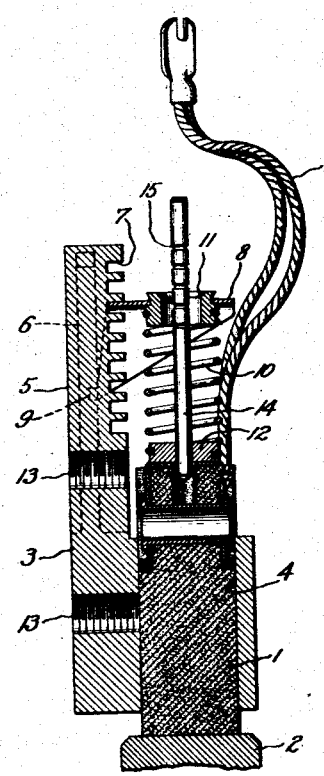
Inventor:
Harvey O. Simmons,
by
His Attorney.

Patented Nov. 27, 1928.

1,693,319

UNITED STATES PATENT OFFICE.

HARVEY O. SIMMONS, OF SCHENECTADY, NEW YORK, ASSIGNOR TO GENERAL ELECTRIC COMPANY, A CORPORATION OF NEW YORK.

TENSION INDICATOR FOR BRUSH HOLDERS.

Application filed December 1, 1926. Serial No. 152,032.

This invention relates generally to brush holders for dynamo electric machines and has for its object the provision of an arrangement for measuring the force exerted by the means employed for forcing the brush against a current collecting device of the machine in which it is employed.

The invention will be more readily understood from the following description taken in connection with the accompanying drawing in which Fig. 1 is a perspective view of a brush holder in its relation to a current collecting device of the dynamo electric machine; and Fig. 2 is a vertical section of the brush holder shown in Fig. 1.

In the accompanying drawing, I have shown a specific form of brush holder with my invention applied thereto, but it will be readily understood that the principle of my invention is applicable to brush holders of any other convenient form. The illustration includes only the brush holder and an associated current collecting device as the other details of the machine form no part of my invention. The brush holder is shown in the drawing in connection with a collector ring, but it is obvious that it is equally well adapted to use with a commutator of a dynamo electric machine.

As illustrated in the drawing, a brush 1 having the usual conductor 1ª for connecting the brush in the circuit of the machine in which it is used, bears on a current collecting device 2 and is supported by a brush holder body 3. The brush holder is provided with a guideway 4 for the brush and also with means for forcing the brush against the current collecting device which comprises a support 5 having longitudinal grooves 6 and notches 7 formed in a face thereof, a yoke 8 comprising a plate having arms 9 thereon engaging the longitudinal grooves 6 of the support 5, and a spring 10 having its axis coaxial with the guideway and seated at one end upon the brush 1. The force of the spring acts on the brush and also upon the yoke 8 turning it pivotally about 9 into engagement with one of the grooves 7. The coil spring 10 carries a coaxial sleeve 11 at one end secured in an opening in the plate of the yoke 8 and a disk 12 at the other end thereof which forms a bearing member for the spring on the brush. The brush holder is supported on a stationary part of the dynamo electric machine in any suitable manner, for example by bolts extending through a brush holder stud and engaging the threaded openings 13. The disk 12 has fixed thereon an extension 14 passing through the spring 10 and sleeve 11 and projecting through the disk into an opening in the brush for maintaining the spring and disk seated on the brush, said extension being movable as a unit with the brush 2 relative to the sleeve 11. It will therefore be clear that as the extension 14 is fixed relative to one end of the spring 10 and movable relative to the other end thereof, that the portion of the extension 14 above the sleeve 11 is a measure of the deflection of the spring 10 and also the force exerted thereby. For convenience in determining the amount of deflection of the spring 10 and the force exerted thereby, the extension 14 is provided with suitable graduation markings 15 for indicating total pounds spring load on the brush.

In the operation of the dynamo electric machine, the rotation of the current collecting device 2 gradually wears away the brush 1 which is forced downwardly in the guideway 4 by the spring 10. As the brush holder is supported by a stationary portion of the machine the downward movement of the brush 1 permits the spring 10 to elongate and thereby reduce its deflection and the force exerted thereby. It will then be necessary to adjust one or more of the brush holders to increase the force exerted by the spring on the brush, and in the specific construction shown by way of example, this is accomplished by forcing downwardly on the outer portion of the yoke 8, thereby causing it to slide out of engagement with the groove in which it is seated and pivot about the portions 9 until the yoke is free to move upward or downward for the desired adjustment. With the change in the deflection of the spring 10 there is a corresponding change in the length of extension 14 above sleeve 11 which is directly proportional to the spring deflection or force exerted thereby. In the present construction the greater the deflection of the spring the greater will be the length of the extension 14 above the sleeve 11, but it is obvious if a tension spring for example, were employed that increased deflection thereof would cause a corresponding decrease in the amount which 14 extended above sleeve 11.

It may be found that in the operation of the dynamo electric machine to which my brush holder is applied, that the desired brush pressure on the current collecting device 2 exists when the spring 10 is deflected an amount corresponding with the third groove from the top of extension 14. In this instance when the brush is first inserted in the brush holder, the yoke 8 will be adjusted on the extension 5 to deflect the spring 10, an amount indicated by the third groove on the extension 14. As the brush wears away, it will be lowered in the guideway 4 and readjustment of the deflection of the spring 10 will be necessary to give the desired brush pressure on the current collecting device. This readjustment is facilitated in my construction because an adjustment of the yoke to such position that the extension 14 shows the same number of markings above the sleeve 11 as when the brush is originally inserted in the holder, the deflection of the spring, and the force exerted thereby on the brush and current collecting device will be the same as it was originally. If it is desired to increase or diminish the pressure on the brush the reading on extension 14 is correspondingly changed.

My construction will be useful in any dynamo electric machine in which brushes are employed, but particularly in machines as ordinarily constructed, wherein a large number of brushes are used. It is desirable that the brushes maintain uniform pressure on the current collecting device and that each brush exert the same pressure. Heretofore it has been inconvenient and difficult to maintain this adjustment because means was not readily available for determining the brush pressure, but by the use of my improved construction the desired adjustment may be made quickly and accurately, as each brush holder indicates the brush pressure, and no inconvenience will be occasioned in maintaining the brush pressure of a large number of brushes equal as they wear away in the operation of the machine.

It will be seen from the foregoing description that I have produced a brush holder construction in which the force exerted by the brush spring on the brush may be readily determined by inspection at any time without any auxiliary measuring apparatus, thereby greatly facilitating the proper adjustment of the brushes of a dynamo electric machine.

I desire it to be understood that my invention is not limited to the particular brush holder shown and described, and I intend in the appended claims to cover all modifications which do not depart from the spirit and scope of my invention.

What I claim as new and desire to secure by Letters Patent of the United States, is,—

1. In a dynamo-electric machine, a brush holder comprising a body having a guideway for the brush, a coil spring arranged with its axis in alignment with the guideway for urging the brush against the current collecting device of the machine, an adjustable plate secured to said body and engaging said spring for compressing the same against the brush, said plate having an opening therein coaxial with said spring, and a graduated extension carried by the brush and projecting through said opening for indicating the pressure exerted by said spring on the brush.

2. In a dynamo-electric machine, a brush holder, comprising a body having a guideway for the brush, a coil spring arranged with its axis in alignment with the guideway for urging the brush against the current collecting device of the machine, an adjustable plate secured to said body and engaging said spring for compressing the same against the brush, said plate having an opening therein coaxial with said spring, a disk carried by said spring for engaging the brush, and a graduated extension secured to said disk and extending through the opening in said plate for indicating the force exerted by said spring on the brush, said extension projecting through said disk for engaging the brush and maintaining the spring seated thereon.

In witness whereof, I have hereunto set my hand this 29th day of November, 1926.

HARVEY O. SIMMONS.